United States Patent [19]
Masovich et al.

[11] Patent Number: 4,633,723
[45] Date of Patent: Jan. 6, 1987

[54] CHAINLESS FEED SYSTEM OF MINING CUTTERLOADER

[75] Inventors: Felix Z. Masovich; Vladimir N. Khorin; Svetlana M. Golubeva; Vyacheslav I. Shishlov, all of Moscow, U.S.S.R.

[73] Assignee: Gosadarstvenny Proektno-Konstruktorsky I Experimentalry Institut Agolnogo Mashinostroenia, Moscow, U.S.S.R.

[21] Appl. No.: 642,674

[22] PCT Filed: May 27, 1983

[86] PCT No.: PCT/SU83/00014
§ 371 Date: Aug. 16, 1984
§ 102(e) Date: Aug. 16, 1984

[87] PCT Pub. No.: WO84/02738
PCT Pub. Date: Jul. 19, 1984

[30] Foreign Application Priority Data
Jan. 11, 1983 [SU] U.S.S.R. ............ 3528703

[51] Int. Cl.⁴ .............. F16H 27/02; E21C 29/02
[52] U.S. Cl. ................. 74/141.5; 74/148; 74/157; 74/169; 299/43; 105/29.1
[58] Field of Search .......... 74/141.5, 144, 146, 74/148, 156, 157, 168, 422, 169; 299/43, 31, 32; 105/29 R, 29 TL

[56] References Cited
U.S. PATENT DOCUMENTS

| | | | |
|---|---|---|---|
| 315,883 | 4/1885 | Arnold | 74/160 |
| 844,356 | 2/1907 | Hegerhorst | 74/157 |
| 1,078,059 | 11/1913 | Mossberg | 74/157 |
| 1,426,718 | 8/1922 | De Florez | 74/157 |
| 1,487,409 | 3/1924 | Wallin | 74/157 |
| 2,414,958 | 1/1947 | Lohse | 74/141.5 |
| 3,429,280 | 2/1969 | Dashew et al. | 74/422 |
| 3,537,754 | 11/1970 | Valantin | 299/43 |
| 4,099,787 | 7/1978 | Askew | 299/32 |

FOREIGN PATENT DOCUMENTS

| | | |
|---|---|---|
| 2718061 | 12/1977 | Fed. Rep. of Germany . |
| 2630443 | 1/1978 | Fed. Rep. of Germany . |
| 1529516 | 10/1978 | United Kingdom . |

*Primary Examiner*—Lawrence Staab
*Attorney, Agent, or Firm*—Lilling & Greenspan

[57] ABSTRACT

A chainless feed system of a mining cutter-loader comprises a guiding rack mounted on a conveyer and meshing with gears rotatably mounted on the cutter-loader. The gears are operatively connected through a rotating mechanism with the hydraulic cylinders operable for rolling the gears along the guiding rack. The improvement of the rotating mechanism includes a carrier with a pawl adapted to engage the gear or come out of engagement therewith. For this purpose the pawl is pivotally mounted on the carrier which is operatively connected with the hydraulic cylinders arranged in opposition with respect to the pawl.

4 Claims, 4 Drawing Figures

CHAINLESS FEED SYSTEM OF MINING CUTTERLOADER

FIELD OF THE INVENTION

The present invention relates to the mining industry, and more particularly to a chainless displacement or feed system of a mining machine, e.g. a mining cutter-loader.

BACKGROUND OF THE INVENTION

There is known a chainless displacement system for a mining machine (see, for example, UK Pat. No. 1,529,516; Cl. E1F 17; Int.Cl.$^2$E21C 29/02), comprising a guiding rack mounted on the working-face conveyer.

The guiding rack permanently meshes with a pair of gears rotatably mounted on the mining machine, the gears being mounted on the mining machine in pairs, secured on shafts rotatable therewith relative to the mining machine. The gears are operatively connected through the rotating mechanism with hydraulic cylinders adapted to actuate the gears for rolling along the rack.

The rotating mechanism of each gear includes toothed racks secured on the ends of the piston rods of the hydraulic cylinders and extending axially of the cylinders.

The rotating mechanism further includes pinions which are mounted on the shafts of the gears and are operatively connected therewith through clutches, these pinions meshing with the toothed racks of the hydraulic cylinders. With the hydraulic cylinder performing its working stroke, the toothed racks rotate the pinions which drive the gears through the intermittently engageable clutches. The gears, the intermittently engageable clutches and the pinions are mounted successively along the axes of the respective shafts.

The displacement of the mining machine, e.g. a mining cutter-loader along the working-face is effected by making one pair of the gears roll along the guiding rack, while the other pair of the gears stays in a preparatory cycle during which the hydraulic cylinders associated therewith are actuated through the return stroke.

With this design of the rotating mechanism incorporating the abovementioned intermittently engageable clutch, the entire chainless displacement system is bound to have relatively large dimensions, particularly, if it is intended to transmit efforts in the 20-30 ton range.

Furthermore, with the successive arrangement of the gears, intermittently engageable clutches and pinions, the dimensions of this chainless displacement system of the prior art in the direction of their arrangement are likewise relatively great. This fact virtually precludes the incorporation of this chainless displacement system of the prior art in a mining cutter-loader intended for operation in thin seams.

SUMMARY OF THE INVENTION

The present invention is to provide a chainless feed system of a mining cutter-loader wherein the rotating mechanism of each gear should be of a structure providing for reducing the dimensions of the chainless feed system.

This aim is attained in a chainless feed system of a mining cutter-loader comprising a guiding rack mounted on the conveyer, meshing with at least one pair of gears rotatably mounted on the cutter-loader and operatively connected through a rotating mechanism with hydraulic cylinders operable for rolling the gears along the guiding rack, in which feed system, in accordance with the invention, the rotating mechanism of each gear includes a carrier rotatably mounted on the shaft of the gear and having a pawl adapted to engage the gear during the working stroke of the rotating mechanism and disengage itself from the gear during the return stroke, for which purpose the pawl is pivotally mounted on the carrier, which is operatively connected with the hydraulic cylinders arranged in opposition relative to the pawl.

With this structure of the rotating mechanism of each gear, the chainless feed system of a mining cutter-loader is of relatively small dimensions, which is of essential significance for the use of the system in mining cutter-loaders intended for operation in thin seams, even in cases where relatively great efforts are to be transmitted.

It is expedient that each pawl be mounted in the same plane with the respective gear.

With this arrangement of the pivotable pawl, the overall dimensions of the chainless feed system of a mining cutter-loader could be further reduced, which creates favourable conditions for incorporating the chainless feed system in a mining cutter-loader intended for thin seams.

It is further expedient that each carrier be provided with two hydraulically controlled detents arranged symmetrically with respect to the longitudinal axis of the carrier, each respective detent being operable to retain a pawl in the position of interaction with the gear, depending on the intended direction of rotation of this gear.

The incorporation of the two hydraulically controlled detents ensures reliable and simple retaining of each pawl, both in the working and braking modes of operation of the chainless feed system. This design further provides for dependable control of the chainless feed system when the direction of the advance of the mining cutter-loader is to be reversed.

Therefore, the chainless feed system of a mining cutter-loader according to the present invention provides for reducing its dimensions, which is of essential importance for performance in thin seams. This reduction of the overall dimensions of the chainless feed system of the herein disclosed structure is easily attained even when relatively great feed efforts of the cutter-loader are to be transmitted.

The herein disclosed chainless feed system of a mining cutter-loader is relatively simple both in its construction and manufacture, hence, it is both reliable and durable.

The abovementioned advantages and other merits of the present invention will become apparent from the following description of its embodiment, with reference being made to the accompanying drawings.

DETAILED DESCRIPTION OF THE INVENTION

Figure 1:
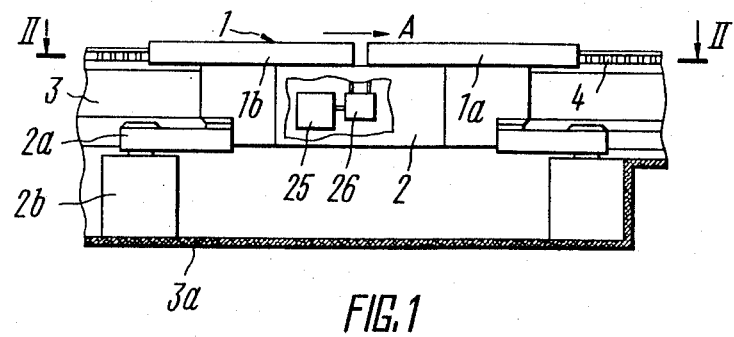
FIG. 1 is a top, plan view, partly broken away, of the chainless feed system.

The chainless system 1 (FIG. 1) for feeding a mining machine, e.g. a mining cutter-loader 2 is intended to displace the latter along the working-face conveyor 3. Mounted on the cutter-loader 2 with the aid of arms 2a are work peforming members 2b which are augers of known structure.

The feed system 1 includes two identical parts 1a and 1b longitudinally spaced along the working-face 3a and comprises a guiding rack 4 mounted on the conveyor 3 and having two parallel bars 5 (FIG. 2) transversely spaced from each other and having mounted in their respective openings a series of transverse cogs 6 uniformly spaced longitudinally in the bars 5.

Rotatably mounted on the cutter-loader 2, namely, on the housing (not specifically indicated) thereof is a pair of gears 7. Each gear 7 is received about a shaft 8 secured to the housing of the cutter-loader 2.

For making each gear 7 roll along the guiding rack 4, two hydraulic cylinders 9 and 10 are incorporated, each gear 7 being operatively connected with its respective hydraulic cylinders 9 and 10 through a rotating mechanism 11.

The rotating mechanism 11 of each gear 7 comprises a carrier 12 rotatably mounted on the shaft 8 of this gear 7. The carrier 12 is in the form of two parallel plates rigidly interconnected at the top in FIG. 2 and referred to by the same numeral 12. Lying on the longitudinal axis 13 of the carrier 12, which is also the carriers axis of symmetry and which intersects with the axis of the shaft 8 of the gear 7, are openings (not shown) in the two plates 12, in which there is mounted a pin 14 thus extending through both plates of the carrier 12, parallel with the shaft 8. Mounted on this pin 14 is a pawl 15 received intermediate the two plates of the carrier 12 for pivoting about the pin 14.

The pawl 15 is adapted to engage its respective gear 7 during the working stroke of the rotating mechanism 11 when the interaction of this gear 7 with the rack 4 displaces the cutter-loader 2, and to disengage itself during the preparatory or return stroke of this mechanism 11 when the gear 7 idly rolls along the rack 4, while the cutter-loader 2 is driven by the gear 2 of the other part of the system 1.

The pawl 15 is in the form of a bar whose height (or the dimension longitudinally of the shaft 8) equals that of the respective gear 7. The bottom (in FIG. 2) portion of the pawl 15 has a shape identical with that of the valley between the adjacent teeth of the gear 7.

The carrier 12 is pivotally connected with the piston rods 16 and 16a of the respective hydraulic cylinders 10 and 9, for which purpose there are provided openings (not shown) arranged symmetrically with respect to the axis 13 of the carrier 12 and having mounted therein pins 17 extending through both plates of the carrier 12 parallel with the shaft 8 and uniformly spaced from the shaft. The heads of the respective piston rods 16 and 16a of the hydraulic cylinders 10 and 9 are received about these pins 17.

Figure 2:
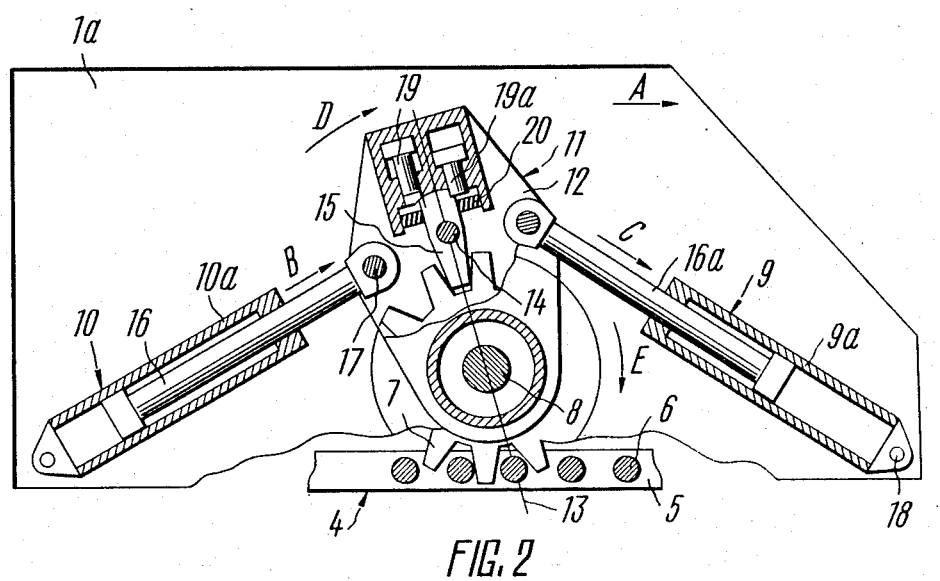
FIG. 2 is an enlarged cross-sectional view taken along lines II—II in FIG. 1 illustrating the rotating mechanism during a working stroke.

The hydraulic cylinders 9 and 10 are arranged in opposition with respect to the carrier 12, as shown in FIG. 2, extending at an acute angle relative to the guiding rack 4, for more compact structure of the feed system 1.

The bodies 9a and 10a of the respective hydraulic cylinders 9 and 10 are pivotably mounted on the housing of the cutter-loader 2 with the aid of pins 18 likewise extending parallel with the shaft 8 and arranged at the respective ends of the housings 9a and 10a, opposite to the arrangement of the heads of the piston rods 16.

The pawl 15 lies in the same plane with the respective gear 7, the plane of symmetry including the centre of the height or thickness of the gear 7, which coincides with the plane of the drawing in FIG. 2, also including the longitudinal axis of the pawl 15.

Therefore, the dimension of the chainless feed system 1 defined by its height or thickness is maximally small.

The carrier 12 is provided with two hydraulically controlled detents 19 and 19a which are hydraulic cylinders accommodated in the body of the carrier 12 intermediate the plates thereof, symmetrically with respect to the longitudinal axis 13 of the carrier 12. The detents 19 and 19a are intended to alternatingly retain the pawl 15 in the position of interaction with the gear 7, depending on the intended direction of its rotation.

The detents 19 and 19a may be also operated simultaneously to arrest the rolling of the gear 7 along the guiding rack 4 when the cutter-loader 2 has to be braked.

There are also two compression springs 20 likewise belonging to the plane including the hydraulic cylinders 9 and 10 and the pawl 15, each spring 20 having one its ends abutting against the body of the carrier 12 and its other end abutting against the respective side of the pawl 15. The springs 20 are intended to introduce the pawl 15 into the valley between the successive teeth of the gear 7 of the corresponding part of the feed system 1 during the preparatory stroke of the rotating mechanism 11, illustrated in FIG. 3.

Figure 3:
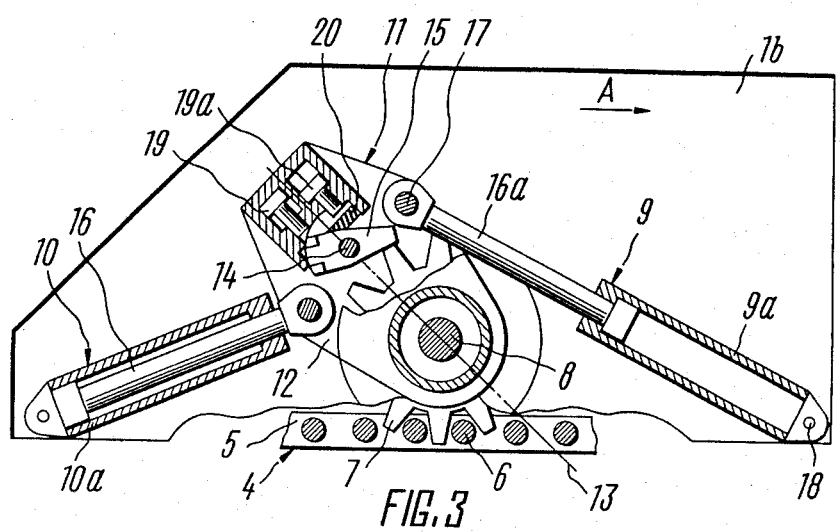
FIG. 3 is a view similar to FIG. 2, and showing the rotating mechanism during a preparatory stroke.

In the modification of the invention shown in FIGS. 2 and 3 the two detents 19 and 19a are arranged symmetrically with respect to the longitudinal axis 13 of the carrier 12.

Figure 4:
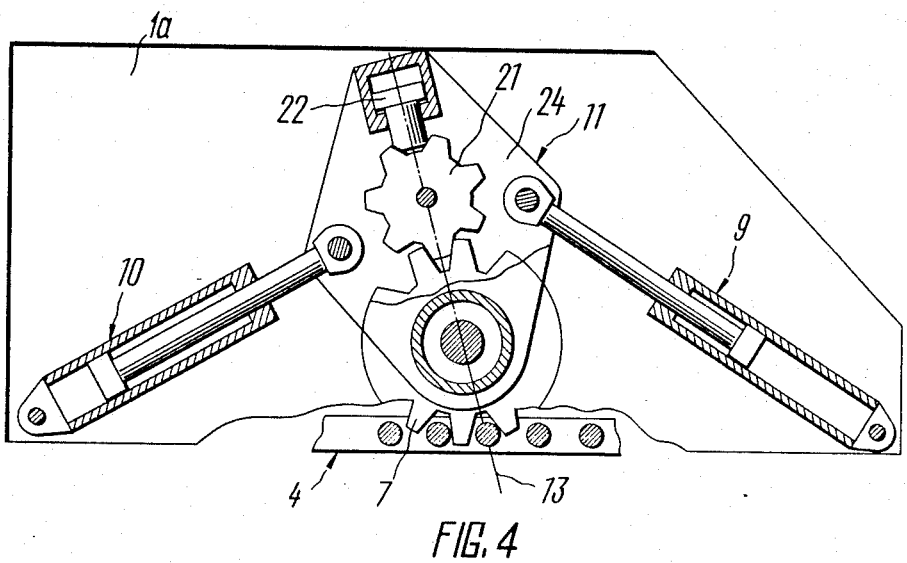
FIG. 4 is a cross-sectional view taken along lines II—II of FIG. 1 and showing a pawl cooperating with a detent.

Shown in FIG. 4 is a modification of the chainless feed system in accordance with the invention, wherein the pawl 21 is in the shape of a sprocket engaging the gear 7. In this modification there is a single detent 22 extending along the axis of symmetry of the carrier 24.

The chainless feed system 1 is supplied with the working fluid under pressure fed by a pump 25 (FIG. 1) mounted on the cutter-loader 2, through a control unit 26.

The herein disclosed chainless feed system operates, as follows.

To advance the cutter-loader 2 along the working face in the direction of arrow A (FIG. 1), the system 1 is brought into its working state. To do this, the control unit 26 is operated to start the pump 25, and the working fluid under pressure is fed into the above-piston space (not specifically indicated) of the hydraulic cylinder 9 of the part 1a of the system 1, and into the below-piston space (not specifically indicated, either) of the hydraulic cylinder 10.

Now the respective piston rods 16 of the hydraulic cylinder 10 and 16a of the hydraulic cylinder 9 move, respectively, in the directions indicated with arrows B and C in FIG. 2. Thereby, the carrier 12 is rotated in the direction indicated with arrow D, while the pawl 15 (whose one end is received between the teeth of the gear 7 and the other end abuts against the detent 19a projected at this stage by the hydraulic pressure) drives the gear 7 for rotation about the shaft 8 in the direction indicated with arrow E. Thus, the gear 7 of the part 1a of the feed system 1 rolls along the guiding rack 4 and drives the cutter-loader 2 through displacement along the conveyor 3 longitudinally to the working-face 3a in the direction indicated by arrow A.

Simultaneously, the working fluid under pressure is fed into the under-piston space (not specifically indicated) of the hydraulic cylinder 9 (FIG. 3) and the above-piston space (not specifically indicated) of the hydraulic cylinder 10 of the part 1b of the system 1, wherein the rotating mechanism 11 performs a preparatory stroke, as illustrated in FIG. 3.

The respective piston rods 16 and 16a of the hydraulic cylinders 10 and 9 of the part 1b of the feed system 1 move in the directions, as it is shown in FIG. 3, opposite to those of the movement of the piston rods 16 and 16a shown in FIG. 2, while the carrier 12 likewise is rotated in the direction opposite to that shown in FIG. 2. The gear 7 here idly rolls along the rack 4, with the pawl 15 transmitting no effort to this gear 7 and oscillating about its pivot pin 14 under the action of the successive teeth of the gear 7. The left-hand spring 20 (in FIG. 3) urges the pawl 15 into repeated interaction with the gear 7. The control unit 26 ensures that the preparatory stroke of the rotating mechanism 11 of the part 1b shown in FIG. 3 is completed somewhat earlier than the moment of completion of the working stroke of the rotating mechanism 11 of the part 1a in FIG. 2 of the feed system 1, so that there can be initiated the transition of the part 1b of the system 1 from the preparatory stroke according to FIG. 3 to the working stroke corresponding to FIG. 2, whereas the part 1a of the system 1 is switched over from the working stroke to a preparatory one. The cycle is repeated. The repetition of such cycles provides for continuous feed or displacement of the cutter-loader 2 along the guiding rack 4 mounted on the conveyor 3.

When the motion of the cutter-loader 2 has to be reversed, the detent 19a is hydraulically retracted in the direction away from the gear 7, and the detent 19 is protracted likewise hydraulically into engagement with the pawl 15, whereby the gear 7 is now rotated in the opposite direction. The operation of the entire system 1 remains the same as described hereinabove.

Should it be necessary to arrest the cutter-loader 2 in an inclined seam, either in operation or in a case of emergency (e.g. the pressure dropping in the system), both detents 19 and 19a are hydraulically moved into engagement with the pawl 15, so that any rotation of the gear 7 about the shaft 8 is precluded. The cutter-loader 2 is braked now by the teeth of the gears engaged between the cogs 6.

The operation of the herein disclosed chainless feed system in the modification illustrated in FIG. 4 is similar to the operation described above, with the exception that the single detent 22 is permanently in indirect interaction with the gear 7. For moving the rotating mechanism 11 through the working stroke, the detent 22 is operated to engage the pawl 21, while during the preparatory stroke it is moved out of this engagement.

Industrial Applicability

The present invention can be utilized to utmost effectiveness in a machine for mining minerals, preferably, a coal cutter-loader.

The chainless feed system in accordance with the present invention can be also used with cutter-loaders operated for auxiliary work in mines, e.g. for entry-driving.

What is claimed is:

1. A chainless feed system of a mining cutter-loader having a guiding rack mounted on a conveyor and meshing with at least one pair of gears rotatably mounted on the cutter-loader, the guiding rack connected through a rotating mechanism of the gears with hydraulic cylinders operably rolling the gears along the guiding rack, wherein the improvement comprises: a carrier rotatably mounted on a shaft of each of said gears and connected to a first end of each of the hydraulic cylinders forming an acute angle relative to the guiding rack; and a pawl pivotally mounted on a longitudinal axis of said carrier which intersects an axis of said shaft of said gears, said pawl adjacent said first ends of said hydraulic cylinders and having one end of said pawl engaging each of said gears during a working stroke of the rotating mechanism and disengaging from said gears during a return stroke of the rotating mechanism.

2. A chainless feed system according to claim 1, wherein said pawl is mounted in a same plane with the gear of said carrier which it engages and disengages during said working and return strokes of the rotating mechanism.

3. A chainless feed system according to claim 1, wherein said pawl is shaped as a sprocket.

4. A chainless feed system according to claim 1, wherein said carrier comprises at least two hydraulically controlled detents arranged symmetrically with respect to a longitudinal axis of said carrier and each of said detents retains said pawl in an interacting position with the gears during said working and said return strokes of the rotating mechanism.

* * * * *